United States Patent [19]

Takeguchi et al.

[11] 4,297,222
[45] Oct. 27, 1981

[54] METHOD OF PURIFYING WATER IN FISH KEEPING WATER TANK

[75] Inventors: Masanobu Takeguchi; Isao Oyobe, both of Fujisawa, Japan

[73] Assignee: Marui Industry Co., Ltd., Tokyo, Japan

[21] Appl. No.: 137,269

[22] Filed: Apr. 4, 1980

[30] Foreign Application Priority Data

Apr. 10, 1979 [JP] Japan .................................. 54-42474

[51] Int. Cl.³ .............................................. C02B 1/38
[52] U.S. Cl. .................................. 210/748; 210/169; 250/436; 422/24
[58] Field of Search ...................... 210/169, 748, 335; 422/24; 250/436

[56] References Cited

U.S. PATENT DOCUMENTS

| | | | |
|---|---|---|---|
| 2,809,753 | 10/1957 | Atkinson | 210/335 |
| 3,640,391 | 2/1972 | Carpenter, Jr. | 210/169 |
| 3,661,262 | 5/1972 | Sanders | 210/169 |
| 3,723,304 | 3/1973 | Storck | 210/169 |
| 3,741,158 | 6/1973 | Moe, Jr. et al. | 210/169 |
| 3,926,556 | 12/1975 | Boucher | 422/24 |
| 3,971,947 | 7/1976 | Lambert et al. | 422/24 |
| 4,017,735 | 4/1977 | Siegel | 210/169 |
| 4,033,719 | 7/1977 | Cohn et al. | 210/169 |
| 4,052,960 | 10/1977 | Birberch et al. | 210/169 |
| 4,141,686 | 2/1979 | Lewis | 422/24 |
| 4,141,830 | 2/1979 | Last | 422/24 |
| 4,151,085 | 4/1979 | Malik | 422/24 |
| 4,179,616 | 12/1979 | Coviello | 210/748 |
| 4,229,202 | 10/1980 | Mullerhem | 422/24 |

Primary Examiner—Theodore A. Granger
Attorney, Agent, or Firm—Oblon, Fisher, Spivak, McClelland & Maier

[57] ABSTRACT

A water treating method is disclosed. Water stored in a container is circulated through an external passageway and subjected to ultraviolet radiation and biological oxidation treatment, whereupon the growth of undesired aquatic chlorophyceae and microorganisms is inhibited and at the same time, organic matter is decomposed and removed, thereby maintaining a low COD level and clarifying water in the container. This method is particularly useful for keeping water in a container clean.

5 Claims, 5 Drawing Figures

METHOD OF PURIFYING WATER IN FISH KEEPING WATER TANK

FIELD OF THE INVENTION

This invention relates to a method of treating water stored in a container, and more particularly, to a method in which such water is circulated through an external passageway and subjected to ultraviolet radiation and biological oxidation treatment, whereupon the growth of undesired aquatic chlorophyceae and microorganisms in water is inhibited and at the same time, organic matter is decomposed and removed, thereby maintaining low BOD and COD levels of the water.

BACKGROUND OF THE INVENTION

Water used in conventional water tanks for keeping fish are purified by being passed through a layer of gravel or a filter medium made of synthetic resin fiber placed on the bottom or top of the tank. The layer of gravel or filter medium has two functions; it intercepts organic matter such as fish excretion and feed residue, and the microorganisms growing on the gravel or filter medium decompose such organic matter. In the conventional method, water passes through gravel or filter medium simply by gravity, and because it is low pressure, the layer of gravel or filter medium is clogged in three or four weeks and the microorganisms within the layer lose their ability to purify water by decomposing organic matter. In consequence, water within the tank becomes cloudy and chlorophyceae grow on the side walls and bottom walls of the tank to such an extent that one cannot look through it. Such water will be a favorite place for pathogenic and other miscellaneous bacteria that attack the fish kept in the tank. Thus, with the conventional method it is difficult to keep the water in fish tanks clear over an extended period. What is more, some microorganisms are the cause of fish diseases. Therefore, frequent water replacement and cleaning of the inside of the tank as well as the gravel or filter medium layer are required. This means not a little time and labor is required. Hence, an effective method has long been desired for purifying water in tanks used for keeping fish in homes or aquariums.

It is known that such organic matter can be effectively decomposed and removed by a biological oxidation process that uses microorganisms. Typical examples of such biological oxidation treatment are (1) catalytic oxidation by trickling filtration that uses a film of microorganisms and which is suitable for the treatment of waste water having a relatively low concentration of contaminants and (2) suspension oxidation by activated sludge process suitable for the treatment of waste water having a high concentration of contaminants. When water contained in an aquarium is subjected to biological oxidation by passing it through a gravel bed of a synthetic fiber filter medium, the gravel bed or the filter medium is soon blocked, say, in a few weeks, and its refining capacity is reduced and the water becomes contaminated.

The conventional technique uses only method (1) and, as already mentioned, is affected by filter clogging within a relatively short time and fails to achieve the intended effect. In such conventional technique, chlorophyceae that grow on the tank side walls or bottom walls are removed by a suitable means for scraping the walls, or instead, an anti-algal paint is coated onto the walls of the tank or an algicide of low fish toxicity is supplied to the water. However, these methods have their own problems: with the first method complete cleaning is difficult to achieve; in the second method, a substance toxic to fish is released into water; in the third method, one algicide gives only a temporary effect, and another exhibits a lingering residual effect that is toxic to fish, or chlorophyceae that have died in large numbers will putrefy and decrease the oxygen dissolved in water and/or emit a malodor.

BRIEF SUMMARY OF THE INVENTION

Therefore, one object of this invention is to provide a method of purifying water contained in water reservoirs or fish keeping tanks by circulating water having a relatively low level contamination (Ca, several tens of ppm in terms of COD) through an external circulating system provided outside of the container and subjecting the circulating water to ultraviolet radiation and biological oxidation to thereby inhibit the growth of undesired aquatic chlorophyceae and decompose organic matter so that water is kept clear for an extended period.

Another object of this invention is to provide a water purification method that enables keeping fish in a container filled with water for an extended period while keeping the water clear with quality and suitable for fish without letting chlorophyceae grow within the water.

A further object of this invention is to provide an apparatus particularly adapted for use in the above treatment for maintaining the clarity of water in a container.

DETAILED DESCRIPTION OF THE INVENTION

Figure 1:
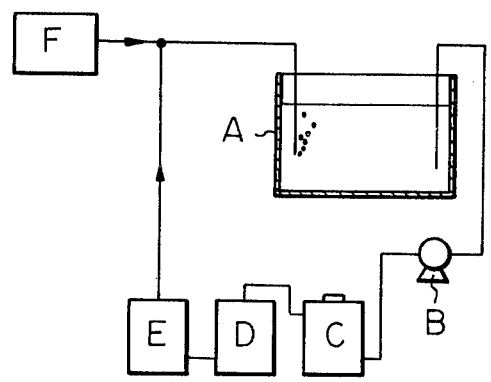
FIG. 1 is a diagram that shows the arrangement of a water vessel, an irradiation vessel and biological oxidation apparatus as used in the practice of this invention.

The essential aspect of this invention is as follows: the water in a tank is circulated through a system including the water tank, UV irradiation tank and at least one purifying tank. The UV irradiation tank incorporates a UV lamp that emits UV radiation of short wavelength, and the circulating water is first supplied to this tank where it is exposed to a dose of UV radiation that is greater than a certain level as defined by a dose given per pass or per residence time. Then, the water is fed to at least one purifying tank which comprises a support cylinder wrapped with a cylinder or bag of a free-permeable synthetic nonwoven fabric of high porosity which serves as a bed on which microorganisms will grow and which allows substantially uniform permeation of the circulating water through its entire surface, and the thus purifed water is returned to the water tank.

According to this invention, the purifying tank comprises a container having an inlet and an outlet which contains a bag or cylinder which serves as a microorganism-growing bed made of a porous, high-permeable synthetic resin nonwoven fabric that is installed on a support in such a manner that a space is provided between the bed and the inner walls of the container so that the circulating water is passed through the bed under pressure from outside or inside of the bed substantially uniformly over its surface, and the UV irradiation tank comprises a container having an inlet and an outlet which has a short-wave UV lamp mounted therein. Water in the water tank is constantly circulated through the purifying tank(s) and UV irradiation tank for purification purposes. By this arrangement, all surfaces of the microorganism-growing bed can be effectively utilized as a place where bacteria that decompose organic matter in water to be purified are deposited and grow, and enhanced oxidative decomposition of organic matter in water is realized. In addition, since water to be purified is passed under pressure through the microorganism-growing surface of said bed, a certain quantity of microorganisms growing on the bed are removed by the water passing through the bed and accordingly its clogging is delayed considerably. Furthermore, a floc of separated bacteria is suspended in a space between the growing bed and the inner walls of the container.

As a result, the method of this invention achieves a degree of purification efficiency much higher than has been possible to attain by the conventional method that performs oxidative decomposition of organic matter by bringing circulating water into simple contact with the microorganisms grown on a layer of gravel or synthetic resin nonwoven fabric. What is more, short wave UV radiation generated in the UV irradiation vessel is not only used for bactericidal purposes but also for supplementing the treatment with organisms. By virtue of the UV radiation, the birth and growth of chlorophyceae which are higher organisms than bacteria and fungi are suppressed or existing chlorophyceae are killed. Other advantages of the method are: it exhibits effects which are not temporary, a large numbers of microorganisms will not be killed or putrefied all at once, no toxic substance will be formed or remain undecomposed, no plants other than chlorophyceae or animals will be affected adversely, and overall economy of water purification is offered.

Purifying water by combining the purifying tank and UV irradiation vessel provides the following additional advantages.

1. Organic cloring substance or organic matter cannot be treated completely in a purifying tank alone, but upon exposure to repeated irradiation of short-wave UV rays during water circulation, it is partially degraded or has its molecular weight decreased. As a result, it becomes susceptible to the decomposing action of microorganisms and a great decrease in COD level is achieved.

2. A malodorous substance that cannot be removed by treatment with organisms alone as well as a malodorous substance produced by microorganisms are decomposed.

3. Bacteria flowing out of the purifying tank are sterilized by UV radiation, and the sterile bacteria are then introduced into the purifying tank where they are decomposed. As a result, both bulking due to accumulated excess bacteria and clogging of the microorganism-growing bed are prevented.

This invention is now described in detail in connection with preferred embodiments. FIG. 1 is a flow diagram representing one embodiment of this invention, wherein A is a fish keeping tank, B is a circulating pump, C is an UV irradiation vessel, D is the first purifying tank, E is the second purifying tank, and F is an air pump.

Figure 2:
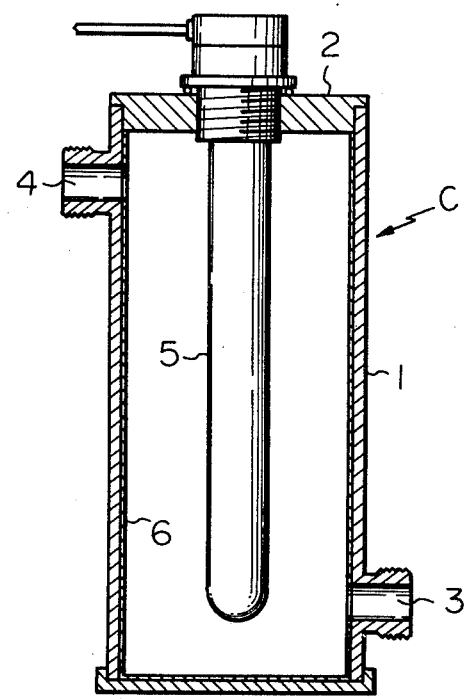
FIG. 2 is a cross section of a UV irradiation vessel to be used in the method of this invention.

FIG. 2 is a cross section of the UV irradiation vessel C. The vessel comprises a frame 1 of synthetic resin the top of which is closed airtight with a lid 2. In the lower part of the frame, an inlet 3 for water to be purified is provided, and an outlet 4 for treated water is provided in the upper part. The numeral 5 represents a waterproof, double-tubed UV lamp which is detachably installed in the center of the lid 2. The numeral 6 is a reflective plate with which the inside walls of the vessel are lined to achieve adequate irradiation of UV rays. The UV lamp 5 emits UV rays of a wavelength less than 280 nm, preferably 253.7 nm and provides an illuminance of at least 2 $\mu$W/cm$^2$ at a distance of one meter.

Figure 3:
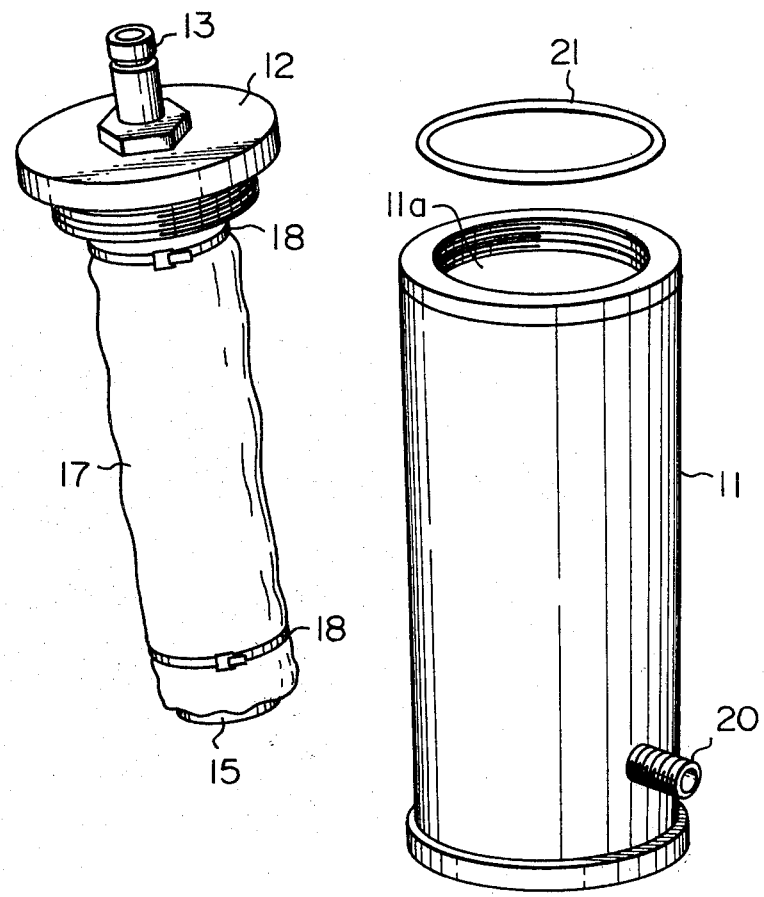
FIG. 3 is an exploded perspective view of a biological oxidation apparatus to be used in the method of this invention.
Figure 4:
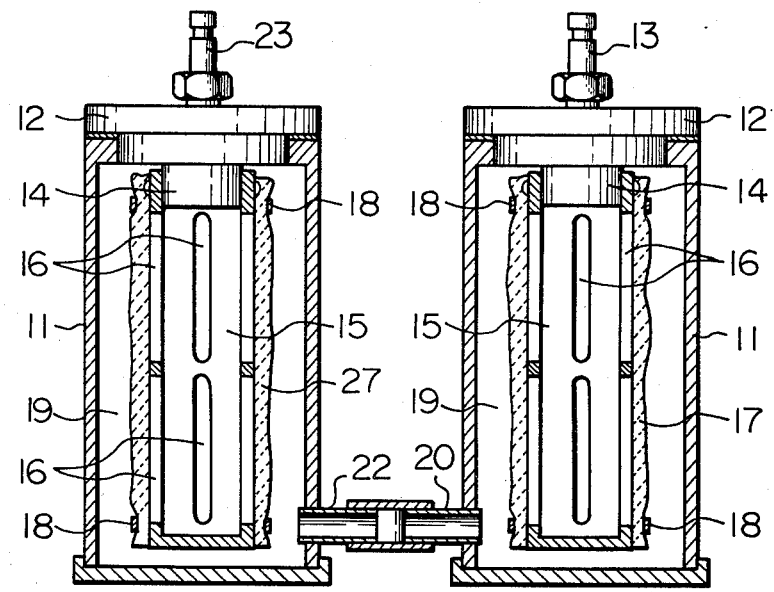
FIG. 4 is a vertical cross section of a pair of the biological oxidation apparatuses connected in series.

FIG. 3 is an exploded perspective view of each purifying tank. FIG. 4 is a cross section of the first and second purifying tanks connected in series. Each purifying tank comprises a frame 11 made of a synthetic resin and a lid 12 which closes a top opening 11a and which is joined therewith by screwing. The central opening of the lid 12 is connected to an inlet 13, the underside of the lid 12 has a projection 14 on which a supporting cylinder 15 is installed, and the lid has a central hole through which water passes. The cylinder 15 has a plurality of slits 16 provided in the side wall, a closed bottom, and an open top which is joined with the projection 14 to provide free communication with the inlet opening 13. The slits 16 may be replaced by a number of small spherical openings. The cylinder 15 may be joined with the projection 14 by screwing, press-fitting, or by making a half turn of a cylinder 15 provided with a projection that engages a notch in a projection 14. The entire periphery of the cylinder 15 is a free-permeable microorganism-growing bed 17 made of a synthetic nonwoven fabric, and both ends of the bed are bound by nylon bands 18 so that water to be purified keeps running through said bed 17. The bed 17 is made of nylon, polyurethane, polyvinyl chloride, polyvinylidene chloride fiber or a mixture thereof. In the illustrated embodiment, the first purifying tank D employs a microorganism-growing bed made of a mixture of polyvinyl chloride, polyvinylidene chloride and polyurethane fibers (100–500$\mu$ in size) and having a porosity of at least 90%. On the other hand, the second purifying tank E uses a bed of nylon fibers (50–200$\mu$) having a porosity of at least 70%. The bed 17 may be of an elongated bag into which the cylinder 15 is inserted, and its upper end may be bounded with a band. In this case, the cylinder 15 may be of a pipe having no bottom. In the figures, 19 is a space provided around the microorganism-growing bed 17 in the frame 11, 20 is an outlet, 21 is an O-ring that is to be disposed between the frame 11 and the lid 12.

The second purifying tank E is similar to the first purifying tank D except that it uses a free-permeable synthetic resin bed 27 of lower porosity than that used in the first tank. Another difference is that it has an inlet 22 in the lower part and an outlet 23 in the upper part. The microorganism-growing bed used in the second purifying tank is made of a finer material than in the first tank because by so doing, a floc of microorganisms suspended in the second tank after it has separated from the growing bed of the first purifying tank will not flow out of the second tank.

Using the system described above, this invention purifies water in the following way. Water in the water tank A is sent into the UV irradiation vessel C through the inlet 3 by means of the circulating pump B. An UV lamp in the vessel emits UV rays having a predominant wavelength of 253.7 nm and which provides an illuminance of 8 $\mu W/cm^2$ at a one-meter distance. For the purpose of inhibiting and eliminating chlorophyceae, it is required that the wavelength and dose of UV radiation as well as the circulation rate of water be held higher than a given value as will be specified hereunder.

The water exposed to UV radiation in the vessel C is then directed into the first purifying tank D through the inlet 13. It enters the support cylinder 15 from above, permeates the synthetic resin fibers of the bed 17 through the slits 16 and reaches the space 19 outside the cylinder 15. Microorganisms will grow on the bed 17 in a few days of operation of the system, and water to be purified contacts them while it is passing through the bed. The microorganisms deposited on the bed will separate intermittently from the bed and be suspended in water as a floc. Water being purified also makes contact with the floc before it is discharged from the first purifying tank through the outlet 20. It then enters the second purifying tank E through the inlet 22, passes through the microorganism-growing bed 27 as it is making contact with the microorganisms deposited on individual fibers that constitute the bed, enters the cylinder 15 through the slits 26, and comes out of the outlet 23 to return to the water tank A. Water in the tank A keeps circulating in the manner described above. As a modified arrangement, the first purifying tank D may be separated from the second purifying tank E by another vessel where water is brought into contact with suspended microorganisms. According to the water treatment of this invention, all surfaces of the microorganism-growing bed through which water is passing offer an effective area for deposition of microorganisms, and once deposited, microorganisms provide enhanced activity of oxidizing and decomposing organic matter in water. Since the growing bed of the first purifying tank D comprises a fabric of higher porosity, water which is forced through it will cause separation of some of the microorganisms that have grown on the bed as flocs. On the other hand, the second purifying tank E uses the growing bed 27 of lower porosity which intercepts suspended flocs of microorganisms and lets them remain suspended around the bed as long as the water to be purified is circulating. Therefore, the foul water makes frequent contact with such microorganisms and the large capacity of the system of this invention is retained over an extended period of time. It is to be understood that the growing beds 17 and 27 may comprise a nonwoven fabric of the same porosity. Two purifying tanks are employed in the above illustrated embodiment. Instead, only a single such tank or more than two tanks may be used. If only one purifying tank is used, an outlet may be disposed in the upper part of the tank, and this is sufficient to prevent flocs of suspended microorganisms from going out of the tank. If necessary, the outlet of the tank may be provided with a filter. In FIG. 1, an air pump F is shown which supplies air into the water tank A as required. In the embodiment illustrated above, both ultraviolet irradiation vessel and purifying tanks are of closed type, but one or both of them may be of open type. Therefore, another embodiment of this invention is described below wherein one of the two purifying tanks is closed, and the other is open.

Figure 5:
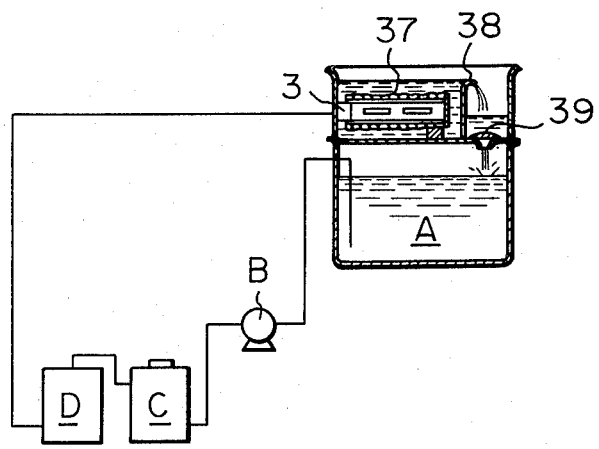
FIG. 5 shows another arrangement of this invention.

FIG. 5 shows another embodiment of the system of this invention wherein the second purifying tank E is divided into two compartments by a partition wall, has its top open and is positioned above the water tank. In one compartment, a microorganism-growing bed 37 of the same construction as the growing beds, 17, 27 is fixed in a horizontal position. Water in the water tank is passed through the closed type UV irradiation vessel C and the first purifying tank D by means of the pump B, and it is then supplied to the second purifying tank through the inlet 3. In this embodiment, water first enters the support cylinder, passes through the growing bed 37, flows into the other compartment across the partition all 38, passes through the filter 39 on the bottom of that compartment and returns into the water tank by gravity. The mechanism by which water is purified by this embodiment in no way differs from the first embodiment.

Other modifications using an open type UV irradiation vessel or purifying tank are conceivable. Whatever arrangement is employed, it is necessary to prevent a provision against the leakage of UV radiation from the UV irradiation vessel.

To demonstrate the effectiveness of the method of this invention, it was compared with the conventional method in the following manner. Forty small-size tropical fish were kept in each of two 50-liter water tanks. In one tank, water was treated in the conventional method by circulating it through a layer of gravel, ground particles of coral or a nonwoven fabric of synthetic resin fiber that was disposed on the bottom or the top of the tank. Water in the other tank was circulated and treated by the method of this invention. Three months later and without any water replacement, the COD levels of the water in the two tanks were less than 1 ppm (for water treated by the method of this invention) and 28–30 ppm (for water treated by the conventional method). These values show the very high purification efficiency of this invention compared with the conventional method. Although in the subsequent treatment by the conventional method, water replacement and washing of the filter medium were conducted at intervals of 3 to 4 weeks, the COD level could not be reduced to less than 10 ppm. In contrast, the method of this invention could maintain a COD level of less than 1 ppm without requiring such frequent cleaning of the microorganism-growing bed. This condition could be retained for 3 to 4 years or more without any replacement of water after cleaning the microorganism-growing bed at the sixth month of water treatment. Cleaning of the growing bed is very simple: the bed is taken out of the water tank and cleaned. This is far simpler than the frequent replacement of water that has been necessary in the conventional method. The purification capacity of the system of this invention which used two purification tanks connected in series could be soon restored by first cleaning the growing bed in one of the two tanks and then, after a certain interval, cleaning the growing bed in the other. In contrast, the conventional method required at least a few days before microorganisms started to grow on the cleaned growing bed and exhibited their purification capacity.

About three months after the treatment by the conventional method, chlorophyceae grew in water and turned it to green, and dense algal growths were deposited on the inner surfaces of the side walls, making it difficult to look through the water tank. When the method of this invention was applied to such water, the following results were obtained. The UV lamp employed emitted UV radiation having a predominant wavelength of 253.6 nm and provided an illuminance of 8 μW/cm². Water was circulated continuously at a rate per hour of at least half to eight times the volume of water in the water tank. The amount of suspended chlorophyceae decreased gradually, and one week later, the water became clear. After about one month, almost all chlorophyceae had separated from the walls, and those remaining on the walls could simply be brushed off. With continuous exposure of circulating water to UV radiation, the water did not turn to yellow or any other color and remained clear. There was no regrowth of chlorophyceae. When the illuminance of ultraviolet rays was reduced to less than 2 μW/cm² (1 m), chlorophyceae began to grow in the water again in 2 or 3 weeks. Alternatively, when water was circulated at a rate that completed one circulation of the tank capacity in three hours, it became foul and algae began to grow about seven days later. This experiment shows that for inhibition and elimination of chlorophyceae, the wavelength and dose of UV radiation and the rate of water circulation must each be held at a value higher than a certain level. Particularly good results were obtained when the hourly water circulation rate was from two to eight times the volume of water in the water tank.

Treatment of seawater was also conducted with a 50-liter glass water tank containing ten seawater fish. The UV lamp used emitted UV radiation having a predominant wavelength of 253.7 nm and provided an illuminance of at least 4 μW/cm² (1 m). The hourly water circulation rate was from two to ten times the volume of water in the water tank. The treated water remained clear for almost two years without giving life to any chlorophyceae, and the fish grew well.

When the illuminance of UV radiation emitted from the UV irradiation vessel was gradually decreased, the condition of the treated water in the water tank changed as shown in the table below. As the table indicates, when the illuminance was less than 2 μW/cm² (1 m) for a 50-liter water tank, water gradually yellowed and the COD level exceeded 4 ppm.

TABLE

| Illuminance of UV radiation at 1 m (μW/cm²) | Dose of UV radiation at one pass (μW·min/cm²) | Dose of UV radiation in 1-hr circulation (μW·min/cm²) | COD (ppm) | Chlorophyceae |
|---|---|---|---|---|
| 20 | 1700 ~ 6700 | 13400 | <1 | non-existent |
| 14 | 1200 ~ 4700 | 9400 | <1 | |
| 8 | 680 ~ 2680 | 5370 | <1 | |
| 2 | 170 ~ 671 | 1340 | <1 | |
| 1.5 | 128 ~ 503 | 1000 | >4 | came to life and killing impossible |

The dose of UV radiation to which water is exposed in the UV irradiation vessel used in the method of this invention is now described. Generally, the dose of radiation is in inverse proportion to the square of the distance from a light source, and the dose of UV radiation to which given volume of water in the water tank is exposed at one pass through an UV irradiation vessel can be represented by the following formula:

$$P = (100/r)^2 \times W \times (V_1/A) \quad (\mu W \cdot min/cm^2) \quad (1)$$

wherein
r = the inside diameter of the UV irradiation vessel;
$V_1$ = the volume of the UV irradiation vessel;
W = the illuminance of UV rays measured at a one-meter distance from the light source; and
A = the water circulation rate (l/min).

In the experiment described above, r = 3.86 cm, $V_1$ = 0.85 l, and W = 8 μW/cm². Since the volume of water running through the piping and UV irradiation vessel is so much smaller than the volume of the water tank ($V_0$ = 50 l), it can be safely disregarded in calculating the water circulation rate as follows:

Circulation rate for two circulations per hour $$A_1 = (2V_0/60) = 1.7 \ (l/min)$$

Circulation rate for eight circulations per hour $$A_2 = (8V_0/60) = 6.7 \ (l/min)$$

The doses of UV radiation to which water in the tank circulating at the rates $A_1$ and $A_2$ is exposed upon one pass through the irradiation vessel are written as $P_1$ and $P_2$, and they are calculated from formula (1) as follows:

$$P_1 = (100/3.86)^2 \times 8 \times (0.85/1.7) = 2684.6 \ (\mu W \cdot min/cm^2)$$

$$P_2 = (100/3.86)^2 \times 8 \times (0.85/6.7) = 681.2 \ (\mu W \cdot min/cm^2)$$

It is generally considered that about 650 to 6000 μW·min/cm² of UV radiation is required to kill 99.9% of fungal spores which are more resistant to UV radiation than bacteria. Since algae are higher organisms than fungi, more UV radiation seems necessary to kill them. This will be understood from the fact that the direct rays of the sun kill bacteria and fungi whereas algae grow well and proliferate upon exposure to the sun. An ultraviolet bactericidal lamp per se is not affected by moisture, but bacteria and fungal spores which are supposed to be killed by the lamp get more resistant in the presence of moisture. On the other hand, UV radiation is more attenuated in water than in air. Therefore, it is generally considered that the required dose of UV radiation in water is at least 6500 to 66,000 μW·min/cm² which is ten times as much as the required dose in air.

From the above facts and the results of our experiments, it has been found that one circulation of water is not sufficient to kill all chlorophyceae present by exposure to 681.2 to 2684.6 μW·min/cm² in one pass. According to our observation, the intended object can be achieved by repeating water circulation at such a rate that at least half of the volume of water in the water tank is circulated per hour on the condition that either a given volume of water is exposed to at least 170 μW·min/cm² of UV radiation in one pass through the irradiation vessel or it is exposed to a total of at least 1000 μW·min/cm² of UV radiation during a one-hour circulation. Presumably, continuous supply of water which contains suspended spores of chlorophyceae to the UV irradiation vessel inhibits the growth of the chlorophyceae.

Therefore, in the method of this invention, a UV lamp in the water circulating path is not sufficient to achieve satisfactory control of algal growth. Three other factors, i.e. the wavelength of UV radiation, its dose, and water circulation frequency, must be specified. Only by satisfying these conditions can this invention achieve one of its objects, i.e. preventing proliferation of chlorophyceae.

Predominant wavelength of UV radiation: less than 280 nm

Dose of UV radiation: a given volume of water is exposed to a dose of at least 170 $\mu$W·min/cm$^2$ at one pass through the irradiation vessel or it is exposed to a total dose of at least 1000 $\mu$W·min/cm$^2$ during a one-hour circulation Water circulation rate: at least half of the volume of water in the water tank is circulated per hour, with the above conditions satisfied UV irradiation may be performed continuously or intermittently. For intermittent UV irradiation, possible deficiency in total dose must be compensated by an increased illuminance of the UV lamp or an increased water circulation rate.

If the method of this invention is applied to a new fish keeping tank, not only is birth and growth of chlorophyceae in water inhibited but growth of chlorophyceae on the walls which are not directly irradiated with UV rays is also inhibited. If the method is applied to a fish keeping tank already infested with chlorophyceae, the growth of the chlorophyceae is retarded and what is more, the algae themselves can even be eliminated. In addition to these advantages, the method combines the UV irradiation tank with the already described purifying tank and provides a synergistic effect that cannot be obtained by either tank alone.

Having the construction described in the foregoing, the system of this invention is capable of achieving very high efficiency in the purification of water in a fish keeping tank while it is inhibiting the birth and growth of chlorophyceae in the tank, it not only suppresses the birth and growth of new chlorophyceae in the tank but also it can eliminate already grown chlorophyceae by retarding their growth. This invention has high ability to decompose and remove any contaminant. What is more, it is highly adaptive to a variation in the degree of contamination and such effect is obtainable at a faster speed than with the conventional technique. As a further advantage, an organic coloring substance and other organic colored substance and other organic matter that cannot be treated with a purifying tank alone is degraded or reduced to a low-molecular substance by repeated exposure to short-wave UV radiation, thus becoming susceptible to microorganisms which decompose such organic matter and reduce the COD level of the water. Malodorous substances that cannot be eliminated by the action of microorganisms alone as well as those which are produced from microorganisms can be decomposed by this invention. Any bacteria flowing out of the purifying tank are sterilized by UV radiation and re-enter the purifying tank where they are decomposed by microorganisms. As a result, accumulation of excessive bacteria is prevented and clogging of the growing bed is minimized. Therefore, the method of this invention can provide for many years clear and clean water that is suitable for the life of fish without need for replacement of water, and for this reason, it will prove very useful in the maintenance of fish keeping water tanks. Moreover, the method can be operated with a simple and endurable apparatus which is also easy to disassemble and cleaned. Hence, the overall system is compact and requires no large space when in use.

What is claimed as new and desired to be secured by Letters Patent of the United States is:

1. A method of purifying water in a fish keeping water tank comprising:
    (A) circulating water at a rate such that at least half the volume of water in the tank is circulated per hour;
    (B) passing the water through a UV irradiation vessel providing UV radiation having a predominant wavelength of less than 280 nm, wherein the water is exposed to at least 170 $\mu$W·min/cm$^2$ of UV radiation at one pass through said vessel, or a given volume of water is exposed to a total of at least 1000 $\mu$W·min/cm$^2$ of UV radiation during a one-hour circulation of the water;
    (C) introducing the water into a first purifying tank having an inlet and an outlet and which includes a support cylinder wrapped with a first microorganism-growing bed of free-permeable nonwoven fabric made of synthetic resin and having a predetermined mesh size no smaller than 100$\mu$, passing all of said water through said growing bed, to thereby bring the introduced water into contact with microorganisms and to separate some of said microorganisms from said growing bed, introducing said water into a space in said first purifying tank downstream from said first microorganism growing bed, where microorganisms separated from said first growing bed are suspended and grow, to thereby bring the water into contact with such microorganisms in said space; and
    introducing the water into at least one second purifying tank located downstream from said first purifying tank, each said second purifying tank having a free-permeable synthetic resin microorganism-growing bed.

2. A method according to claim 1 wherein at least twice the volume of water in the tank is circulated per hour.

3. A method according to claim 1 or 2 wherein the source of UV radiation is a UV lamp emitting UV radiation having a predominant wavelength of 253.7 nm.

4. A method according to claim 1 wherein said first purifying tank is a closed type purifying tank.

5. The method of claim 1 wherein the mesh size in each said second purifying tank is smaller than said predetermined mesh size.

* * * * *